(12) United States Patent
Kim et al.

(10) Patent No.: US 9,803,762 B2
(45) Date of Patent: Oct. 31, 2017

(54) BALL CHECK VALVE APPARATUS

(71) Applicant: Chung Hyo Kim, Seoul (KR)

(72) Inventors: Chung Hyo Kim, Seoul (KR); Sang Gon Kim, Uijeongbu-si (KR)

(*) Notice: Subject to any disclaimer, the term of this patent is extended or adjusted under 35 U.S.C. 154(b) by 0 days.

(21) Appl. No.: 15/060,223

(22) Filed: Mar. 3, 2016

(65) Prior Publication Data

US 2016/0186873 A1 Jun. 30, 2016

(51) Int. Cl.
  *F16K 15/02* (2006.01)
  *F16K 15/04* (2006.01)
  *E03F 7/04* (2006.01)

(52) U.S. Cl.
  CPC ............... *F16K 15/04* (2013.01); *E03F 7/04* (2013.01)

(58) Field of Classification Search
  CPC .................................. E03F 7/04; F16K 15/04
  USPC ........... 137/533.11, 533.23, 533.25, 533.29, 137/533.31
  See application file for complete search history.

(56) References Cited

U.S. PATENT DOCUMENTS 2,447,729 A * 8/1948 Bertea .................. F16K 15/063
                                                    137/533.29

* cited by examiner

*Primary Examiner* — Kevin Lee
*Assistant Examiner* — P. Macade Nichols
(74) *Attorney, Agent, or Firm* — Novick, Kim & Lee, PLLC; Jae Youn Kim

(57) ABSTRACT

Provided is a ball check valve apparatus including: a first body into which wastewater is introduced; a second body coupled to the first body to be communicated with the first body and configured to discharge the wastewater introduced into the first body; and a valve member disposed in the first body such that the valve member is movable up and down in the first body and configured to close an opening/closing hole formed in the first body by a self-weight thereof and open the opening/closing hole by a pressure of wastewater introduced through the opening/closing hole.

4 Claims, 5 Drawing Sheets

BALL CHECK VALVE APPARATUS

STATEMENT REGARDING PRIOR DISCLOSURES

The present application claims the grace period exception under AIA 35 USC §102(b)(1)(A) to Korean Patent Registration No. 10-1559077 (published on Oct. 8, 2015), which is hereby incorporated by reference in its entirety.

BACKGROUND OF THE INVENTION

1. Field of the Invention

The present invention relates to a ball check valve apparatus, and more particularly to a ball check valve apparatus that is installed in a wastewater pipe to prevent wastewater from flowing backwards.

2. Description of the Related Art

In general, a check valve apparatus installed in a wastewater pipe according to the related art includes a structure that has a flip type opening/closing member mainly having a thin disk such that the interior of a pipe is selectively opened and closed while the opening/closing member is rotated forward or rearward.

However, as the opening/closing member of the check valve apparatus according to the related art is frequently opened and closed, fatigues are accumulated in the opening/closing member and thus, a hinge of the opening/closing member is frequently damaged.

Furthermore, a damage and impact noise are generated due to an excessive water impact when the opening/closing member closes the pipe, and solids contained in wastewater are interposed between the opening/closing member and the inner side of the pipe, making the operation of the opening/closing member unsmooth.

Moreover, because the check valve apparatus according to the related art separately includes a valve seat structure for supporting the opening/closing member, the structure of the check valve apparatus is complex so that the check valve apparatus cannot be easily manufactured and maintained, causing an increase in the price of the product due to deterioration of productivity.

SUMMARY OF THE INVENTION

The present invention has been made in an effort to solve the above-mentioned problems, and provides a ball check valve apparatus that is installed to a wastewater pipe to reduce noise and damages to the ball check valve apparatus with a simple structure.

In accordance with an aspect of the present disclosure, there is provided a ball check valve apparatus including: a first body into which wastewater is introduced; a second body coupled to the first body to be communicated with the first body and configured to discharge the wastewater introduced into the first body; and a valve member disposed in the first body to be elevated and configured to close an opening/closing hole formed in the first body by the self-weight thereof and open the opening/closing hole by a pressure of wastewater introduced through the opening/closing hole.

The valve member may include a spherical opening/closing part seated at a periphery of the opening/closing hole, a connection part vertically extending from an upper side of the opening/closing part, and a guide ring disposed to be perpendicular to the connection part and having a pair of through-holes through which wastewater passes.

The ball check valve apparatus may further include a weight balancing boss vertically extending from a lower end of the opening/closing part.

The weight balancing boss may have an inverse conic shape.

The diameter of the guide ring may be larger than the diameter of a discharge hole formed in the second body.

According to the present invention, a separate hinge structure can be excluded from the valve member, and because, a valve seat structure of the valve member is provided in the first body 20 itself, the overall structure thereof can become simple and the ball check valve can be easily manufactured and maintained.

Furthermore, according to the present invention, because the opening/closing part of the valve member has a spherical shape to improve durability, damage to the ball check valve apparatus due to a water impact cause by the flows of the wastewater when the valve member is opened and closed can be reduced and noise can be reduced.

Because a hinge structure is excluded from the valve member and the valve seat structure of the valve member is provided for the first body, the overall structure of the ball check valve apparatus can be simplified and can be easily manufactured and maintained.

In addition, according to the present invention, because the opening/closing part of the valve member has a spherical shape to improve durability, damage to the ball check valve apparatus due to a water impact can be reduced and noise can be reduced when the valve member is opened and closed.

DETAILED DESCRIPTION OF THE INVENTION

Hereinafter, an exemplary embodiment of the present invention will be described in detail with reference to the accompanying drawings. It should be understood that the embodiment described in the following is merely exemplary to help understanding of the present invention and may be variously modified differently from the embodiment of the present invention described herein. Meanwhile, in a description of the present invention, a detailed description and a detailed illustration of the known functions and configurations may be omitted to avoid making the essence of the present invention obscure. Further, the elements are not illustrated in actual scales but some of the elements may be exaggerated to help understanding of the present invention.

Figure 1:
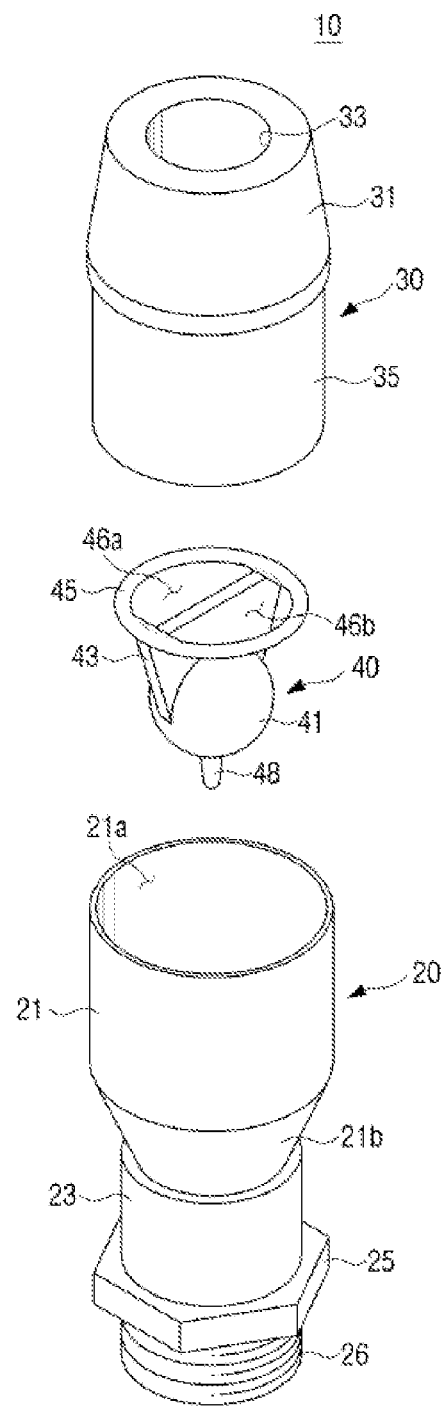
FIG. 1 is an exploded perspective view illustrating a ball check valve apparatus according to an embodiment of the present invention.
Figure 2:
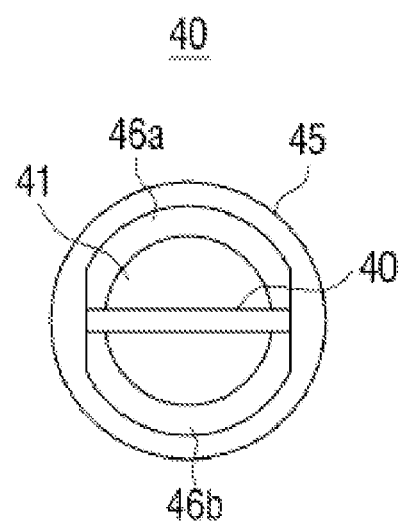
FIG. 2 is a plan view illustrating a valve member of FIG. 1.
Figure 3:
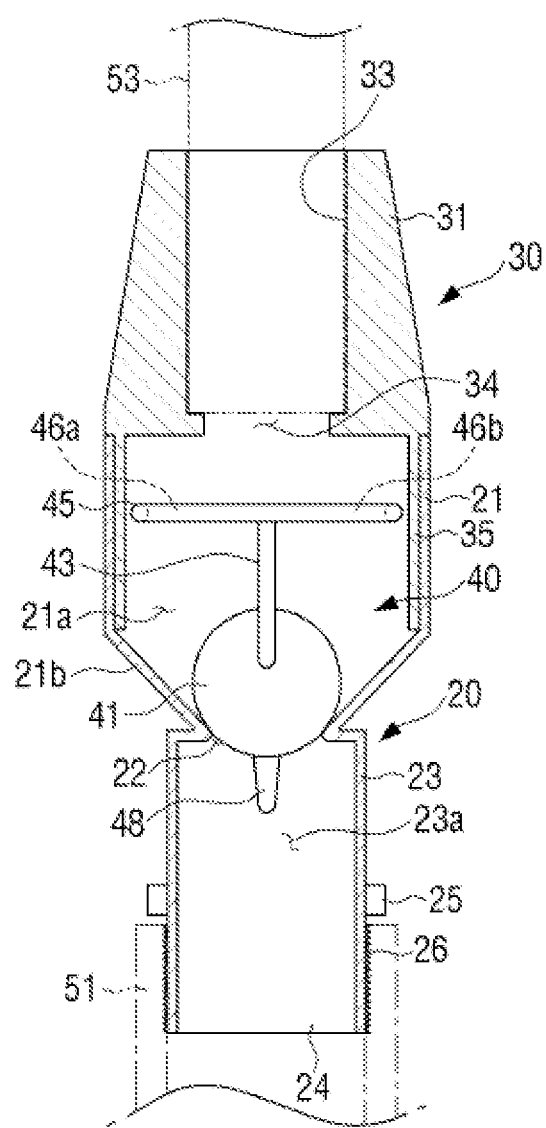
FIGS. 3 and 4 are sectional views illustrating coupled states in which an opening/closing hole is opened and closed as the valve member of the ball check valve apparatus according to the embodiment of the present invention is lifted and lowered.

Referring to FIGS. 1 to 3, a ball check valve apparatus 10 according to an embodiment of the present invention includes a first body 20, a second body 30, and a valve member 40.

The first and second bodies 20 and 30 are disposed between first and second wastewater pipes 51 and 53 (see FIG. 3) for feeding wastewater discharged from a wastewater collection tank (not illustrated).

A lower part 35 of the second body 30 is separately inserted into an upper part 21 of the first body 20. In this case, an accommodation space 21a that defines a movement space in which a valve member 40 may be elevated is formed inside the upper part 21 of the first body 20. The accommodation space 21a also acts as a passage through which wastewater passes.

The upper part 21 of the first body 20 is inclined such that a lower end 21b of the first body 20 becomes gradually narrower as towards the center of the first body 20. Accordingly, an opening/closing hole 22 opened and closed by the valve member 40 is formed inside the first body 20. A periphery of the opening/closing hole 22 acts as a valve seat in which a valve member 40 may be seated.

A screw part 26 is formed at an outer periphery of the lower part 23 of the first body 20 to be screw-coupled to a first wastewater pipe 51. In this case, a hexagonal protrusion 25, with which the head of a spanner (not illustrated) may be fitted, is formed such that the first body 20 may be easily screw-coupled to a first wastewater pipe 51 (here, the first wastewater pipe 51 is directly communicated with a pump (not illustrated)).

Moreover, although it is illustrated in the embodiment of the present invention that the screw part 26 of the first body 20 is connected to the first wastewater pipe 51, the present invention is not limited thereto but the screw part 26 may be directly coupled to the pump (not illustrated). In this case, because a common pump generally has a female thread at an inner periphery of a coupling hole (not illustrated), to which a pipe is connected, it is preferable that the screw part 26 has a male thread in this aspect.

As described above, the lower part 35 of the second body 30 is inserted into the upper part 21 of the first body 20. The second body 30 has a coupling hole 33, to which one end of a second wastewater pipe 53 is inserted, inside an upper part 31 of the second body 30.

A discharge hole 34 communicated with the accommodation space 21a of the first body 20 is formed inside the second body 30. In this case, it is preferable that the diameter of the discharge hole 34 is smaller than the diameter of a guide ring 45 of the valve member 40. This structure prevents the valve member 40 from deviating from the accommodation space 21a of the first body 20 when the valve member 40 is moved upwards by a hydraulic pressure of the wastewater.

The valve member 40 includes an opening/closing part 41, a connection part 43, a guide ring 45, and a weight balancing boss 48.

Figure 4:
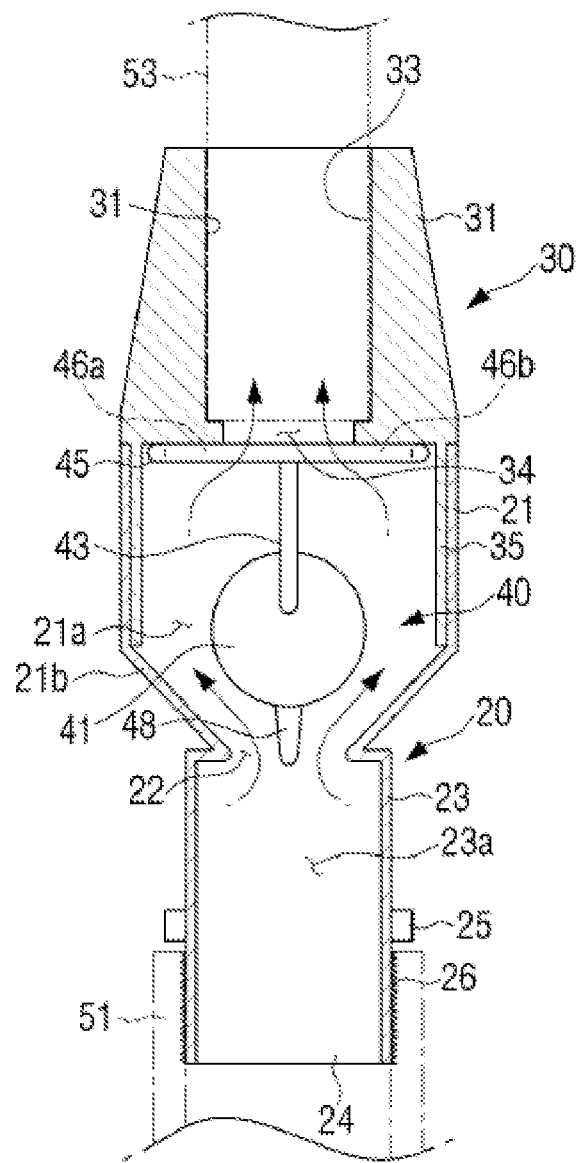

The opening/closing part 41 closes the opening/closing hole 22 of the first body 20 by the self-weight thereof (see FIG. 3), and in contrast, opens the opening/closing hole 22 while rising due to the pressure of the wastewater introduced through an interior space 23a of the lower part 23 of the first body 20 (see FIG. 4)

The connection part 43 is formed to be substantially perpendicular to the upper side of the opening/closing part 41, and supports the guide ring 45 and spaces the guide ring 45 to the upper side of the opening/closing part 41 such that the guide ring 45 maintains a predetermined interval with the opening/closing part 41.

In this case, it is preferable that the connection part 43 has a substantially plate shape and has a thin plate shape not to be interfered by the flows of the wastewater that passes through the accommodation space 21a of the first body 20 through the opening/closing hole 22.

The guide ring 45 is disposed substantially horizontally, and a pair of through-holes 46a and 46b are formed by the connection part 43 as illustrated in FIG. 2. Various solids contained in the wastewater as well as the waste water pass through the pair of through-holes 46a and 46b As illustrated in FIG. 4, the spherical opening/closing part 41 that is lifted by a pressure as the wastewater is introduced through the opening/closing hole 22 is not rotated but lifted substantially vertically by the guide ring 45.

The weight balancing boss 48 extends vertically downwards from a lower end of the opening/closing part 41. In this case, the weight balancing boss 48 is disposed in the vertical direction as that of the connection part 43.

Because the weight balancing boss 48 acts as a weight pendulum, the center of weight of the opening/closing part 41 may be situated on the lower side of the center of the opening/closing part 41 when the opening/closing part 41 is elevated such that the posture of the opening/closing part 41 is maintained together with the aforementioned guide ring 45.

Figure 5:
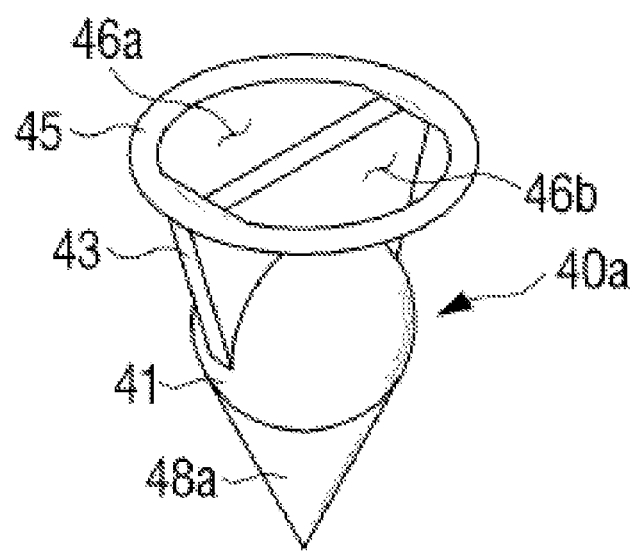
FIG. 5 is a perspective view illustrating another example of the valve member of FIG. 1.

Referring to FIG. 5, the opening/closing member 40a may has a weight balancing boss 48a having a different shape from the aforementioned weight balancing boss 48 of the opening/closing member 40.

The weight balancing boss 48a may have a substantially inverse conic shape at a lower end of the opening/closing part 41.

In this way, when the weight balancing boss 48a is manufactured to have an inverse conic shape, the wastewater introduced into the opening/closing hole 22 may be guided upwards while the interference with the outside of the opening/closing part 41 along an outer peripheral surface of the weight balancing boss 48a is minimized. Accordingly, the flows of the wastewater that passes through the accommodation space 21a of the first body 20 may become smoother.

As described above, because a hinge structure is excluded from the valve member 40 and the valve seat structure of the valve member 40 is provided for the first body, the overall structure of the ball check valve apparatus can be simplified and can be easily manufactured and maintained.

In addition, according to the present invention, because the opening/closing part 41 of the valve member 40 has a spherical shape to improve durability, damage to the ball check valve apparatus due to a water impact can be reduced and noise can be reduced when the valve member 40 is opened and closed.

Although the present invention has been with reference to the limited embodiment and the drawings, the present invention is not limited thereto, but it should be noted that the present invention can be variously corrected and modified by those skilled in the part to which the present invention pertains within the technical spirit of the present invention and the equivalents of the claims, which will be described below.

What is claimed is:

1. A ball check valve apparatus comprising:
   a first body into which wastewater is introduced, the first body comprising an upper part and a lower part;
   a second body coupled to the first body to communicated with the first body and configured to discharge the wastewater introduced into the first body; and
   a valve member entirely disposed in the first body such that the valve member is movable up and down in the first body and configured to close an opening/closing hole formed inside the first body by a self-weight thereof and to open the opening/closing hole by a pressure of wastewater introduced through the opening/closing hole, wherein the opening/closing hole is formed between the upper part and the lower part of the first body, and wherein the valve member comprises:

a spherical opening/closing part seated at a periphery of the opening/closing hole;

a connection part vertically extending from an upper side of the opening/closing part; and a guide ring disposed perpendicular to the connection part and having a pair of through-holes through which wastewater passes.

2. The ball check valve apparatus of claim 1, further comprising a weight balancing boss vertically extending from a lower end of the opening/closing part.

3. The ball check valve apparatus of claim 2, wherein the weight balancing boss has an inverse conic shape.

4. The ball check valve apparatus of claim 1, wherein a diameter of the guide ring is larger than a diameter of a discharge hole formed in the second body.

\* \* \* \* \*